United States Patent
Marini et al.

(10) Patent No.: US 10,706,186 B2
(45) Date of Patent: Jul. 7, 2020

(54) B-REP DESIGN WITH FACE TRAJECTORIES

(71) Applicant: DASSAULT SYSTEMES, Velizy Villacoublay (FR)

(72) Inventors: Laurent Marini, Paris (FR); Quentin Freger, Versailles (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 713 days.

(21) Appl. No.: 15/423,229

(22) Filed: Feb. 2, 2017

(65) Prior Publication Data

US 2017/0220730 A1 Aug. 3, 2017

(30) Foreign Application Priority Data

Feb. 2, 2016 (EP) .................................. 16305117

(51) Int. Cl.
*G06F 30/17* (2020.01)
*G06T 17/00* (2006.01)
*G06F 30/00* (2020.01)
*G06T 17/10* (2006.01)
*G06F 119/18* (2020.01)
*G06F 3/0481* (2013.01)
*G06F 3/0486* (2013.01)

(52) U.S. Cl.
CPC .............. *G06F 30/17* (2020.01); *G06F 30/00* (2020.01); *G06T 17/00* (2013.01); *G06T 17/10* (2013.01); *G06F 3/0486* (2013.01); *G06F 3/04815* (2013.01); *G06F 2119/18* (2020.01); *G06T 2200/24* (2013.01)

(58) Field of Classification Search
CPC .. G06F 17/5086; G06F 17/50; G06F 3/04815; G06F 3/0486; G06F 2217/12; G06F 30/17; G06F 30/00; G06F 2119/18; G06T 17/10; G06T 2200/24; G06T 17/00
USPC ........................................................ 703/1, 7
See application file for complete search history.

(56) References Cited

U.S. PATENT DOCUMENTS 6,629,065 B1 * 9/2003 Gadh ...................... G06T 17/10
345/420
7,733,340 B1 6/2010 Desimone et al.

OTHER PUBLICATIONS

Extended European Search Report dated Aug. 23, 2016, in Europe Patent Application No. 16305117.0, filed Feb. 2, 2016.

(Continued)

*Primary Examiner* — Eunkee Kim
(74) *Attorney, Agent, or Firm* — Oblon, McClelland, Maier & Neustadt, L.L.P.

(57) ABSTRACT

A computer implemented method for designing a 3D modeled object that represents a mechanical part. The method comprises selecting a group of faces of the B-Rep, defining a trajectory for each respective face of the group of faces, computing, for each face of the group of faces, a respective swept volume, the swept volume corresponding to the volume swept by the respective face with respect to the trajectory, assigning a material removal label or a material adding label to each swept volume, according to the position of the swept volume at the respective face with respect to the interior of the 3D modeled object, and updating the B-Rep with a material removal volume and then a material adding volume. The method improves the design of a 3D modeled object.

19 Claims, 10 Drawing Sheets

(56) References Cited

OTHER PUBLICATIONS

Klaus Peter Fahlbusch, et al., "HP PE/SolidDesigner: Dynamic Modeling for Three-Dimensional Computer-Aided Design"; Hewlett-Packard Journal, vol. 46, No. 5, Jan. 1, 1995; 8 pgs.; XP055018224; ISSN:0018-1153.

* cited by examiner

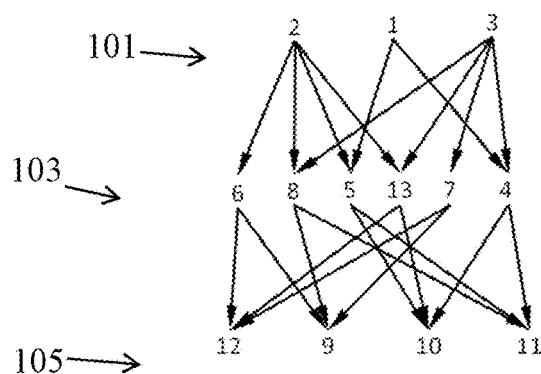
FIG. 10
| | | |
|---|---|---|
| 1 | → | Plane |
| 2 | → | Cylindrical surface |
| 3 | → | |
| 4 | → | Circle 1 |
| 5 | → | |
| 6 | → | Circle 2 |
| 7 | → | |
| 8 | → | Line 1 |
| 9 | → | Point 4 |
| 10 | → | Point 1 |
| 11 | → | Point 2 |
| 12 | → | Point 3 |
| 13 | → | Line 2 |
FIG. 11
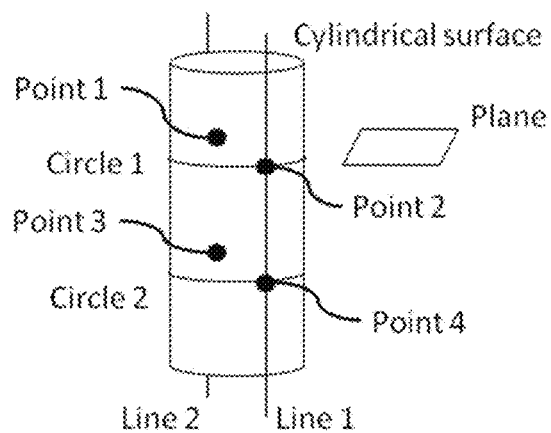
FIG. 12

FIG. 14
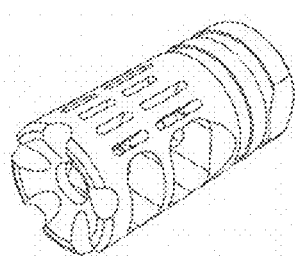
FIG. 15
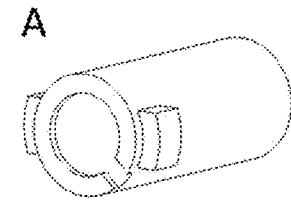
FIG. 16
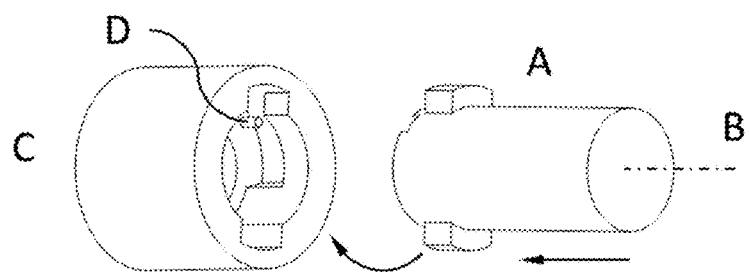
FIG. 17
FIG. 18
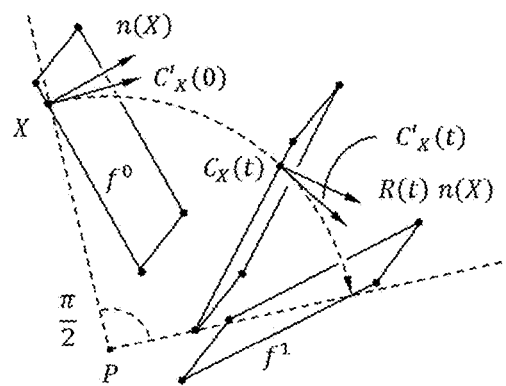
FIG. 19
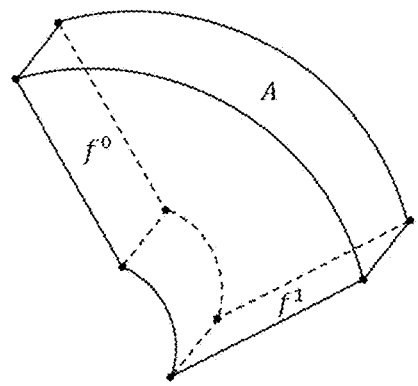
FIG. 20

B-REP DESIGN WITH FACE TRAJECTORIES

CROSS-REFERENCE TO RELATED APPLICATIONS

This application claims priority under 35 U.S.C. § 119 or 365 to European Application No. 16305117.0, filed Feb. 2, 2016. The entire contents of each of the above applications are incorporated herein by reference.

FIELD OF THE INVENTION

The invention relates to the field of computer programs and systems, and more specifically to a method, system and program for designing a 3D modeled object that represents a mechanical part.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Existing technologies allow solid modeling by using a B-Rep modeling CAD system (as opposed to a history-based CAD system). Thus, most commercial CAD systems provide some B-Rep modeling capability. Representative examples are Dassault Systèmes with CATIA Natural Shape, Siemens with Solid Edge Synchronous Technology, and Parametric Technology Corp. with PTC Creo (all registered trademarks). In such systems and in such modeling functionality, the input object is the boundary representation of a solid. There is no associated history (or it cannot be easily used). A typical B-Rep modeling operation is then for the user to select a face and to move it by using the mouse cursor. After the motion is ended, the user releases the mouse button and the system updates the shape of the solid according to the new position of the face. This update is performed by extrapolating and trimming neighboring faces so that the result is a closed and oriented skin. Moving a face of a solid in the direction of its outer normal vector adds material to the solid, as illustrated in FIG. 1. Moving a face in the opposite direction removes material to the solid, as illustrated in FIG. 2.

When the user wants to select a single face and move it along a small distance, there is no specific difficulty in performing the update and in the user-machine interaction. Issues however arise when a user wants to perform complex designs, involving multiple faces and/or relatively large distances. This is due to a well-known behavior of B-Rep modeling: the eraser side effect. A detail of the solid that is deleted by pulling a face is not restored by performing the reverse pushing operation, as illustrated in FIG. 3. In the example shown on FIG. 3, in a first step the user pulls the vertical face so that the cylindrical slot is overlapped by the thicken wall. Then in a second step the user pushes the vertical face back to its initial position. As can be seen, the cylindrical slot is definitely lost. This behavior proves to be an issue when the user wants to perform complex design operations unrelated to the detail, such as the tweaking design operation. For such an operation, as explained in the book by Ian Stroud and Hildegarde Nagy and entitled *Solid Modelling and CAD Systems* (Springer 2011), existing systems require many cumbersome tests and experiments before they can be used by industrial designers. Indeed, a first drawback is that the user needs to make the modification by selecting one face at a time, which requires a long design time. Furthermore, because of the eraser side effect, the user can unintentionally delete important details of the solid. Such details must be designed once again, which is a waste of time.

Within this context, there is a need for improving the ergonomics of B-Rep modeling functionalities of CAD systems.

SUMMARY OF THE INVENTION

It is therefore provided a computer implemented method for designing a 3D modeled object that represents a mechanical part. The 3D modeled object is defined by a B-Rep. The method comprises selecting a group of faces of the B-Rep, defining a trajectory for each respective face of the group of faces, computing, for each face of the group of faces, a respective swept volume, the swept volume corresponding to the volume swept by the respective face with respect to the trajectory. The method also comprises assigning a material removal label or a material adding label to each swept volume, according to the position of the swept volume at the respective face with respect to the interior of the 3D modeled object. The method also comprises updating the B-Rep with a material removal volume and then a material adding volume. The material adding volume corresponding to the union of all swept volumes having a material adding label, each respective swept volume having a material adding label being in the union subtracted by all swept volumes having a material removal label and an end face that collides with the respective swept volume having a material adding label. The material removal volume corresponds to the union of all swept volumes having a material removal label, each respective swept volume having a material removal label being in the union subtracted by all swept volumes having a material adding label and a start face that collides with the respective swept volume having a material removal label.

The method may comprise one or more of the following:
the mechanical part is an axial mechanical part having an axis and the group of faces includes faces that define at least one functional feature of the axial mechanical part;
the trajectories are defined by a sliding edition of the functional feature along and/or around the axis of the mechanical part;
the trajectories are defined by a user via at least one sliding motion graphical user-interaction; and/or
during the sliding edition, the functional feature crosses at least one other functional feature.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

It is further provided a method for manufacturing a mechanical part. The manufacturing method comprises designing a 3D modeled object that represents the mechanical part according to the above design method. The manufacturing method then comprises producing a mechanical part that geometrically corresponds to the 3D modeled object.

It is further provided a mechanical part manufactured by such a manufacturing method.

BRIEF DESCRIPTION OF THE DRAWINGS

Embodiments of the invention will now be described, by way of non-limiting example, and in reference to the accompanying drawings, where:
FIGS. 8, 9, 10, 11 and 12 illustrate the B-Rep format;
FIGS. 13-15 show axial mechanical parts that can be efficiently designed by the method illustrate the method;
FIGS. 16, 17 and 18 illustrate typical edition scenarios where a trajectory is defined by a sliding edition of a functional feature along and/or around the axis of an axial mechanical part;
and
FIGS. 19, 20, 21, 22, 23, 24, 25, 26 and 27 illustrate examples of the method.

DETAILED DESCRIPTION OF THE INVENTION

Figure 4:
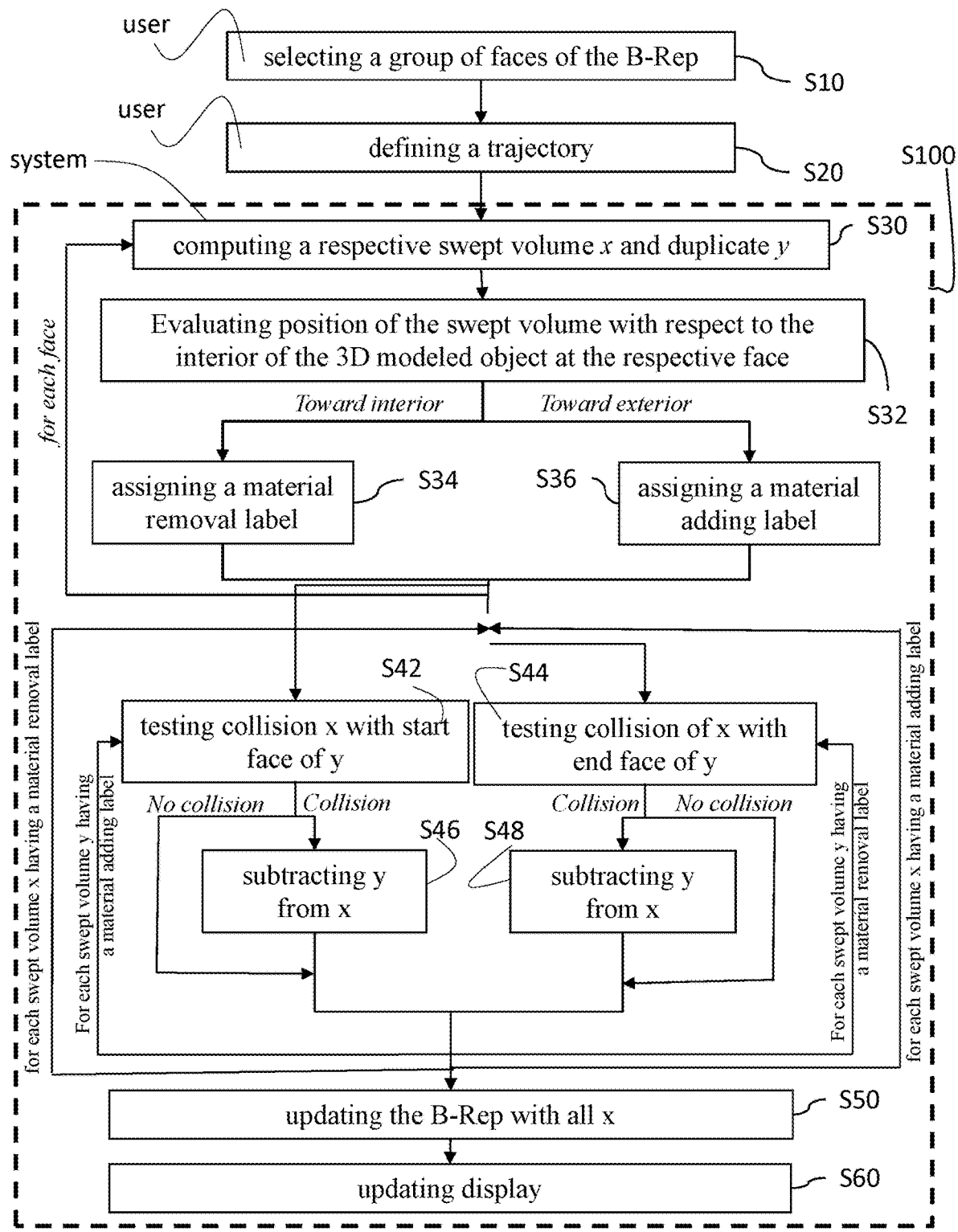
FIG. 4 shows a flowchart of an example of the method.

With reference to the flowchart of FIG. 4, it is proposed a computer-implemented method for designing a 3D modeled object that represents a mechanical part, where the 3D modeled object is defined (at least) by a B-Rep (i.e. a B-Rep data structure representing the mechanical part is present in the input data to be processed). The design includes an ergonomic user-machine interaction, where the user acts on the B-Rep. Steps of the method marked "user" on FIG. 4 are performed via (at least including) user-machine interaction, whereas steps marked "system" may be performed fully automatically. In other examples, steps of FIG. 4 marked "user" may be alternatively performed by a solver (e.g. in a process of automatically updating a B-Rep, in which case the method allows the solver to perform fast and without unnecessarily erasing details). As will be discussed in details, the method of FIG. 4 allows the user to interact with a CAD system to perform B-Rep modeling by selecting at S10 multiple faces at a time and performing relatively complex editions (depending on the trajectories defined at S20). Thanks to the computations performed at S100 being relevant with respect to the type of user-machine interaction designing being performed, the system ensures that design intent is respected, with relatively little (if no) disturbance by the eraser side effect, which is of particular importance in the field of mechanical design.

The method may comprise displaying by the system (to the user) a graphical representation of the 3D modeled object. Faces of the B-Rep may be selectable on the display. In such an example, the interaction may be graphical, and the user may interact directly with the graphical representation of the 3D modeled object. Other examples of the method include the system not displaying a graphical representation of the 3D modeled object or the user not interacting with the graphical representation, but inputting commands another way, for example via dialog boxes. Graphical user-interaction presents high ergonomics.

The user may launch a specific functionality of the system, for example a "B-Rep modeling" functionality. Then, the user selects S10 an (e.g. unordered) group (i.e. set) of (at least two) faces of the B-Rep. Such selection may be performed by sequentially and/or simultaneously interacting with each of the faces to be selected in the group, for example by activating a haptic device on a position of the display that corresponds to the face, such as mouse-button pressing with the mouse cursor positioned on a face and/or sensitive-touching one or more faces one after the other and/or at the same time. The user also defines S20 a trajectory for each of the faces of the group. Such trajectory is any information associated (i.e. linked in the data structure) to the face and representative of a set of positions of the face in the scene (i.e. a referential space where the 3D modeled object is defined). Such a set of positions can be defined at S20 having an order, starting from the current position of the faces, but such ordering information can be also determined automatically and thus need not necessarily be defined by the user (e.g. as an extremity of the trajectory is the current positioning of the respective face, thereby determining the starting positioning). The trajectory may be discrete or continuous.

The trajectory is thereby representative of a motion of the respective face from its current position to an end position. The motion may be the same for all the faces selected at S10, or the motions may comprise disparity. If all the motions are the same, the design intent may for example include a rigid motion of a group of functional faces. The trajectories defined at S20 may be constrained, in order for the system to launch the computations. For example, it may be required that the trajectories respect the following constraints: during the trajectory the face cannot twist and/or during the trajectory the face must slide on an adjacent surface (for example in an axial mechanical part, the adjacent surface is a revolution surface or a surface perpendicular to the axis). Such constraints are detailed later. The system may refuse to execute the rest of the method if the trajectories defined at S20 do not respect any or a combination of such constraints, the system may automatically correct the trajectories (e.g. define a trajectory that is similar to the user request but that respects the constraints), and/or the method may simply be executed and potentially lead to a relatively less relevant result (e.g. and display a warning to the user). This is a matter of implementation.

Each trajectory may be defined at S20 by the user via a sliding motion graphical user-interaction (e.g. a continuous motion of a graphical locus of the display defined by the haptic device of the system), such as moving the mouse cursor or a moving a continuous touch. How to define translations and/or rotations (or sequences thereof) is very well-known from the field of GUIs. The definition S20 may be combined with a selection S10 in a drag-and-drop action (e.g. on a respective face). The drag-and-drop action may comprise pressing a mouse button, then moving the mouse cursor while maintaining the button pressed, and then releasing the button. And/or the drag-and-drop action may comprise touch-pressing on a sensitive screen or pad, sliding the touch, and releasing pressure. These are very well-known user-machine interactions.

On FIG. 4, the selecting S10 and the defining S20 are represented sequentially, but this is not necessarily representative of the real sequence executed by the method. Indeed, the selecting S10 and the defining S20 may be interlaced. The method may for example comprise the user selecting S10 a face and then defining S20 a respective trajectory for the face (e.g. combined in a drag-and-drop action individualized for the face), and then repeating the sequence for as many faces as wanted, resulting in each face that has been selected having a respective trajectory, the motions defined at different repetitions of S20 thereby being possibly different one from the other. Alternatively or additionally, the user may select at S10 at once several faces (sequentially and/or simultaneously), and then define at S20 a single (common) motion that applies to all the currently selected faces and thereby determines their respective trajectories. Such single motion may be defined at S20 via a sliding motion as well, and also via a drag-and-drop (for example of the whole selection, for example via a drag-and-drop on the last selected face). The user may for example click on several faces and then perform a drag-and-drop on a last face, thereby hooking the defining S20 to the last selection S10. The system may provide any or both types of interactions, which may therefore be combined for different faces and/or groups of faces. Also, the system may require a specific command to execute the ulterior computations S100, or execute them upon recognizing automatically an end of S20 (in any way).

Figure 1:
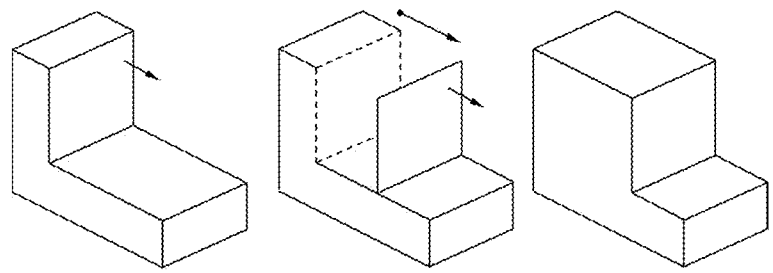
FIGS. 1, 2 and 3 illustrate prior art B-Rep modeling capabilities.
Figure 2:
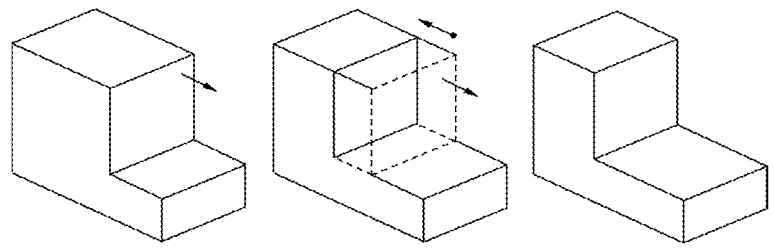
Figure 3:
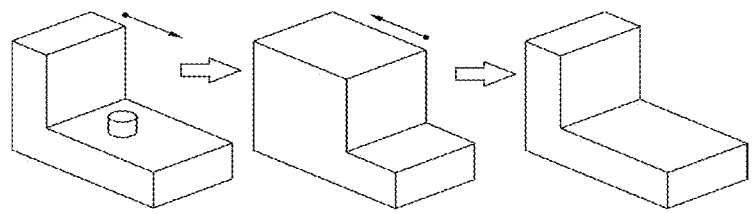

The selecting S10 and the defining S20 of the method of FIG. 1 may be a straightforward adaptation of any method of the prior art (where a user can update a B-Rep by pulling or pushing a single face at a time), but with the specificities that with the method of FIG. 1 the user selects at S10 a group of several faces and then defines at S20 for each respective face any respective trajectory, before the update of the B-Rep occurs via the computations S100, which will now be discussed. The computations S100 discussed in the following may be performed fully automatically by the system. The system may however also provide for user-interaction, for example to refine the computations and/or to allow the user to input wishes. The computations S100 of the example of FIG. 4 include different loops, but this is only an algorithmic representation, as the looping may actually be parallelized. Also, the loops are an implementation option, but the method may implement other ways to reach the same algebraic result.

The method of FIG. 4 first loops over each face selected at S10 to compute S30 a respective swept volume. Again, the computing S30 is represented sequentially with respect to the defining S20, but this is not necessarily the case. The method may indeed wait for the defining S20 of all trajectories to be over before launching the computing S30, or alternatively launch the computing S30 with respect to a face selected at S10 each time the trajectory of that face is defined at S20, or yet even for a single face the computing S30 may be interlaced with the defining S20 (e.g. the computing S30 being continuously performed while the trajectory is being defined S20). Such swept volume naturally corresponds to the volume swept by the respective face with respect to the trajectory defined at S20 for the face being looped. The computing S30 can be performed in any classical way. The swept volumes computed at S30 can then be represented in any way, for example by a B-Rep (which allows an updating S50 that implements B-Rep Boolean operators only and can thus be fast).

In this first loop, the method also evaluates (again, this can be sequential or interlaced with the computing S30) at S32 position of the swept volume with respect to the interior of the 3D modeled object at the respective face (i.e. the face being looped). In other words, the method evaluates at S32 for a given swept volume if locally (i.e. at the start of the motion along the trajectory) the given swept volume goes in the solid or comes out of the solid. This can be performed in any way, for example by evaluating the direction of the face at the start of the trajectory and determining if this direction is toward the interior of the 3D modeled object or toward the exterior (the case of a tangential direction being handled in any way, for example via a system error). An example where this is performed by evaluating the sign of a scalar product of a vector representative of such direction with the outer normal of the B-Rep at that face is provided later. If the swept volume is positioned toward the interior of the B-Rep, the system assigns S34 a material removal label (i.e. tag or flag) to the swept volume. In other words, the system creates data indicative of the fact that a swept volume is intended for material removal (in any way, for example via a Boolean in a predetermined and dedicated data field) and links such data to the data computed at S30 and representative of the swept volume, such data being thus enriched. In the other case (swept volume positioned toward the exterior of the B-Rep), the system assigns S36 a material adding label to the swept volume. Such processing S32-S36 may be performed in any classical way, for example according to the prior art.

At this point, the system is processing labeled swept volumes ("material adding" or "material removal"). Instead of directly updating the B-Rep with these swept volumes (by roughly adding the material adding swept volumes and removing the material removal swept volumes), the method performs a specific refined update. Namely, the update considers a refined version of (at S46 and S48 in the example of FIG. 4) the swept volumes such that the user intent is kept (and notably that the eraser side effect introduces no unwanted perturbation). Furthermore, in order to perform such refining, the method may include tests (at S42 and S44 in the example of FIG. 4) that are fast to execute, because collision of a volume with a face may be tested (rather than with another volume). Indeed, collision between two volumes is longer to test. In the example, the refinement is presented sequential to the previous processing (S32-S36), but again, the method may interlace computations as soon as the required inputs are available.

The method updates (at S50 in the example of FIG. 4) the initial B-Rep according to the user-interaction commands provided at S10 and S20 with a specific material removal volume (i.e. a volume to be removed from the B-Rep, e.g. in whole or in part) and then (i.e. the following second update applies to the B-Rep mathematically speaking to the result of a first update based on the material removal volume, which can be implemented in effect by sequentially removing the material removal volume from the B-Rep and then adding the material adding volume, or with any other implementation that leads to the same algebraic result) with a material adding volume (i.e. a volume to be added to the B-Rep, e.g. in whole or in part). The material removal volume and/or material adding volume may be provided in any format (e.g. as B-Rep themselves) such that the updating S50 may be performed in any way (e.g. via B-Rep Boolean operators, e.g. first the material removal volume is subtracted from the B-Rep with one application of a predetermined B-Rep subtraction operator, e.g. and then the material adding volume is added to the result of the previous operation with one application of a B-Rep addition/union operator). Such ordering allows respect of user-intent.

The material adding volumes may be computed in any way. In any case, the material adding volume corresponds to (in terms of its value, e.g. its value is equal to) a union of possibly refined versions of (e.g. all) swept volumes having a material adding label (and called "material adding volume elements"). Each respective swept volume having a material adding label involved in the union is not necessarily added as such. Indeed, the method subtracts (the subtraction being performed in any way, provided that it leads to the correct algebraic result) from each such respective swept volume (to be added in the union) all swept volumes having a material removal label, at the condition that the end face (of a swept volume to be subtracted) collides (e.g. has a non-zero intersection, that is, a portion of said face having a strictly positive area) with the volume to be added. It is then all the results of such subtractions (the result being possibly the initial swept volume itself if no colliding face was found, the term "subtraction" thereby referring to an algebraic result, subtraction of a given volume with the null volume corresponding to the given volume itself, e.g. without any specific subtraction processing being necessarily implemented in effect) that are in effect added together to result in the material adding volume. The method may operate symmetrically to compute the material removal volume (i.e. by determining a volume that corresponds to the union of all swept volumes having a material removal label, each respective swept volume having a material removal label being involved in the union subtracted by all swept volumes having a material adding label and a start face that collides with said respective swept volume having a material removal label). Thus, the material adding volume and/or the material removal volume can be computed fast. Indeed, the subtractions are focused (instead of all removal swept volumes being systematically subtracted to each adding swept volumes and/or vice-versa, which would lead to a combinatorial explosion). The focusing may stem from computationally easy condition assessments. Yet, the specific focusing operated by the method leads to a good result (i.e. the updates of the swept volumes are performed where needed and user-intent is respected, the eraser effect does not appear where it was not intended and no unintended material is added), thanks to the method being well-adapted to the context of B-Rep modeling, in particular in the field of mechanical design. For example, the method applies particularly well where faces of the B-Rep are each slid (at S10-S20) on an adjacent B-Rep surface, for example with the trajectories being defined at S20 by the user via at least one sliding motion graphical user-interaction. Such user-interactions indeed correspond to material stretching or retracting or displacing, such design operations being particularly useful to mechanical part designers, for example in order to define efficiently mechanical parts characteristics. The method optimizes the computations in such a specific context.

In the example of FIG. 4, the refinement is performed via a second loop S42-48, which is executed for each swept volume computed at S30, and this second loop is represented divided into two branches (one for swept volumes stemming from S34 and the other one for swept volumes stemming from S36). This is only a matter of representation. Now, during this second loop, the swept volumes computed at S30 are potentially refined (before they are involved in the unions for the updating S50). This means that the swept volumes computed at S30 are potentially modified (depending on the result of tests S42 and S44), for example they are potentially reduced. Such reductions take well into account areas of the B-Rep where the eraser side effect should not apply, owing to the user-intent, while still removing material where it is intended.

In the example of FIG. 4, the swept volumes computed at S30 and labeled at S34 or S36 are noted x. These swept volumes x are outputted by the second loop S42-S48 and inputted to the updating S50, after potential refinements (subtraction S46 or S48 depending on test S42 respectively S44). The tests S42 and S44 and the potential subtractions S46 and S48 are each performed on an inputted respective swept volume x (computed at S30 and labeled at S34 or S36) that is then outputted modified, but the computations involve other inputted swept volumes (also computed at S30 and labeled at S34 or S36) which are not outputted. In the example, these other swept volumes are noted y. Actually, the second loop includes a loop on swept volumes x and, within each iteration of the loop on a swept volume x, another loop on swept volumes y. The results x of the double looping are inputted to the updating S50. As can be seen, the value of a swept volume outputted by S30-S36 can be involved as a swept volume y during the looping. This can be handled in any way, for example by the use of intermediate variables. Furthermore, the repartition of swept volumes to determine which ones are x and/or y and to which swept volumes they are y can be determined in any way. In other words, the organization of the double loop can be performed in any way.

In an example, the method duplicates the swept volumes x computed at S30, thereby resulting in duplicates y. The method of FIG. 4 separates swept volumes x in two categories (material adding labels and material removal labels) and performs the same separation on swept volumes y (material adding labels and material removal labels) that are duplicates of initial swept volumes x. The method then loops on each material adding (resp. removal) swept volume x, and for each iterated x, the method further loops on all swept volumes duplicates y having a material removal (resp. adding) label. At each iteration, the method tests at S44 (resp. S42) if y's end (resp. start) face collides with x, and if this is the case, the method then updates x by subtracting y from it at S48 (resp. S46). The method then performs the updating S50 of the B-Rep with volumes x (e.g. volumes y may be discarded), as explained above, and as exemplified later. In such a configuration, the tests at S42 and S44 are performed fast, and subtractions at S46 and S48 are performed only when relevant. This makes the method very efficient, computationally speaking.

The method is computer-implemented. This means that the steps (or substantially all the steps) of the method are executed by at least one computer, or any system alike. Thus, steps of the method are performed by the computer, possibly fully automatically, or, semi-automatically. A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, in particular a mechanical part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique involves the modeling and analysis of complex systems composed of a plurality components from different fields of physics without CAD geometry data. CAE solutions allow the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 5:
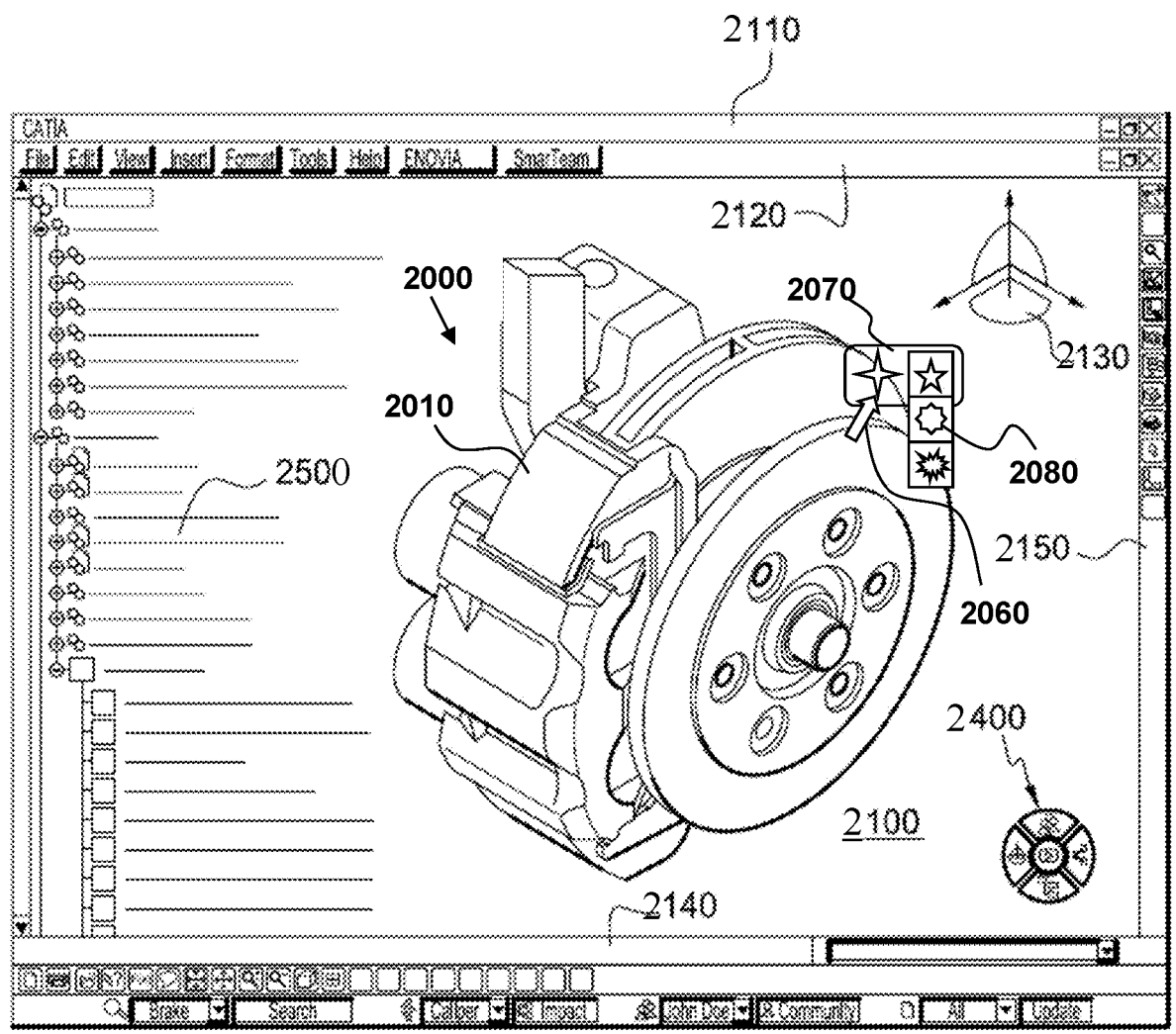
FIG. 5 shows an example of a graphical user interface of the system.

FIG. 5 shows an example of the GUI of the system, wherein the system is a CAD system. The method may be applied on the display, for example by graphically acting on the B-Rep faces represented on the figure.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of FIG. 5, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 6:
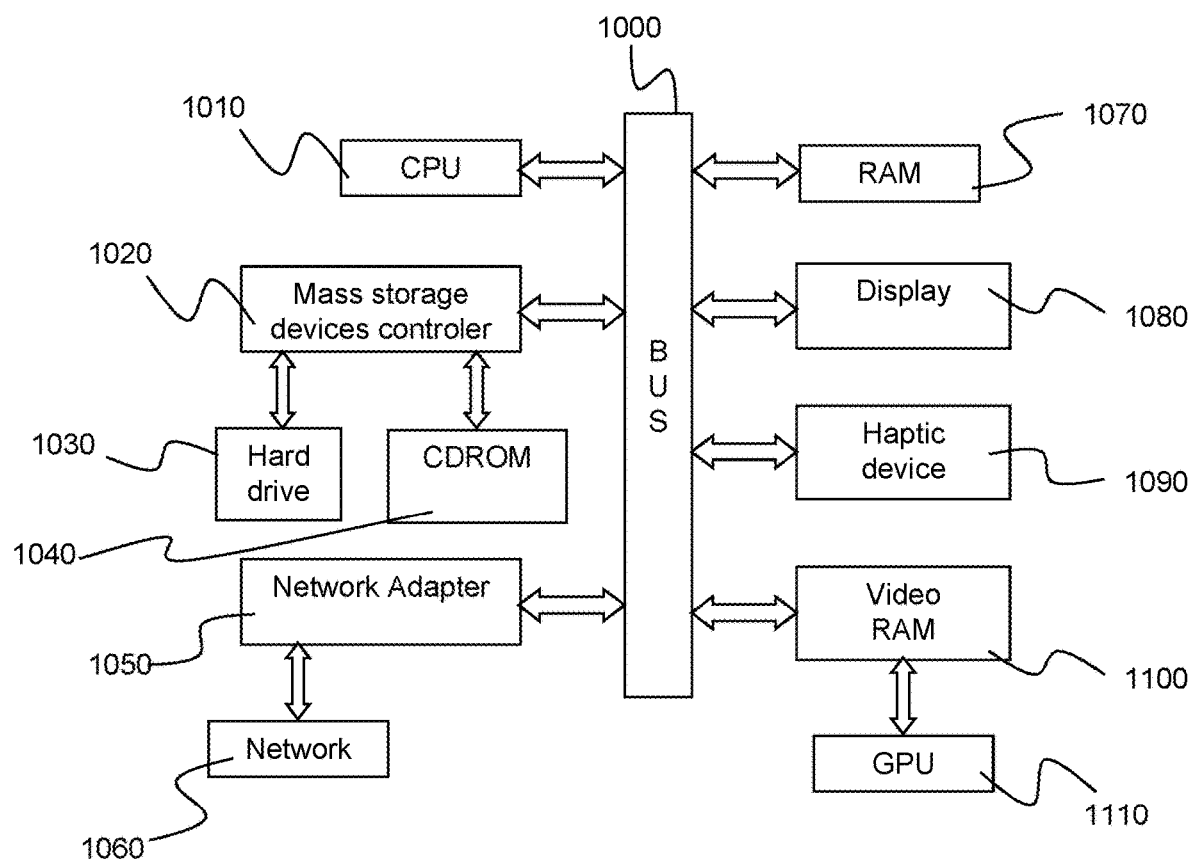
FIG. 6 shows an example of the system.

FIG. 6 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object. The method may be included in a manufacturing process, which may comprise, after performing the method, producing a physical product geometrically corresponding to the modeled object.

Figure 7:
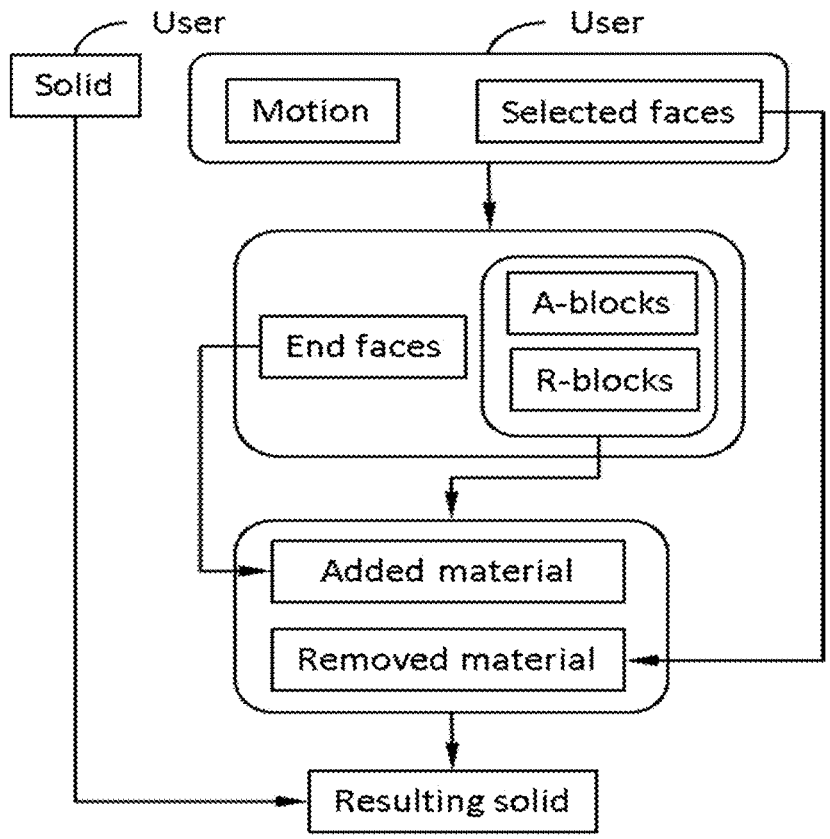
FIG. 7 shows a diagram illustrating the main steps of an example of the method, in line with the example of FIG. 4.

FIG. 7 illustrates a high-level example of the method, in line with the example of FIG. 4.

The method of FIG. 7 allows the designer to modify the boundary representation (B-Rep) of a solid represented by a 3D modeled object, by selecting and defining a trajectory (via a motion in the example) for the faces (e.g. by pulling/pushing them). The purpose is to define the shape of a mechanical part represented by the solid. With the method, several faces can be moved at the same time provided their respective influence zones are separated from each other. Furthermore, the resulting shape can be anticipated by the designer, making the system predictable and easy to use. The input objects of the method of FIG. 7 are the boundary representation s of a solid, a group (i.e. set) of selected faces on this solid, and a motion trajectory to be applied to all selected faces. The output object is the updated boundary representation S' of the solid according to the faces displacements.

By using initial selected faces and the motion trajectory, the method of FIG. 7 computes the corresponding swept volumes. Depending on the relative orientation of the trajectory and the outer normal vectors of selected faces, each volume is labeled "A-block" if it is supposed to add material to the solid, or "R-block" if it is supposed to remove material from the solid. Then, a priority between overlapping A-blocks and R-blocks is defined by investigating interferences between the following geometries: A-blocks, R-blocks, initial positions of selected faces, final positions of selected faces. Thanks to this priority, A-blocks and R-blocks are combined together so that the appropriate amount of material $M^+$ to be added to the input solid and the appropriate amount of material $M^-$ to be removed from the solid are well defined. The very last step is to remove $M^-$ and to add $M^+$ to the input solid according to formula $s'=(S-M^-)\cup M^+$. The diagram shown on FIG. 7 illustrates these main steps.

Allowing the user to perform modifications by selecting several faces at the same time is clearly a productivity improvement, and avoiding the eraser side effect saves the input solid integrity, making the design change safer by escaping part checking and local redesign.

The input of the method is the well-known B-Rep format that models a solid. As widely known, a B-rep model includes topological entities and geometrical entities. Topological entities are: face, edge, and vertex. Geometrical entities are 3D objects: surface, plane, curve, line, point. By definition, a face is a bounded portion of a surface, named the supporting surface. An edge is a bounded portion of a curve, named the supporting curve. A vertex is a point in 3D space. They are related to each other's as follows. The bounded portion of a curve is defined by two points (the vertices) lying on the curve. The bounded portion of a surface is defined by its boundary, this boundary being a set of edges lying on the surface. Edges of the face's boundary are connected together by sharing vertices. Faces are connected together by sharing edges. By definition, two faces are adjacent if they share an edge. Similarly, two edges are adjacent if they share a vertex. Such information is enough input data for the method.

Figure 8:
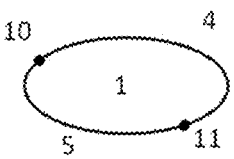
Figure 8:
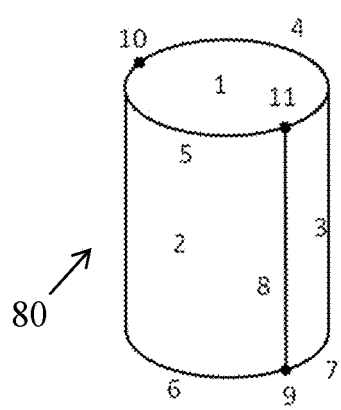
Figure 9:
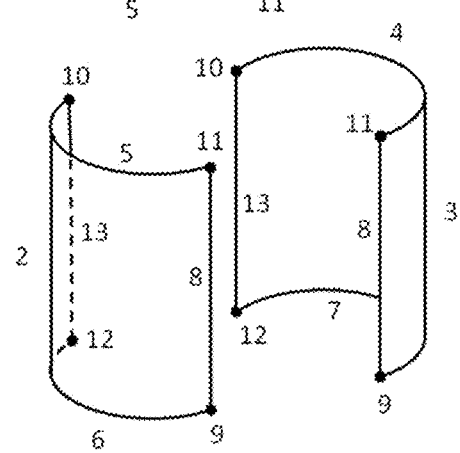

FIGS. 8 and 9 illustrate the B-rep model of a cylindrical slot 80 (that may for example represent a functional feature involved in examples of the method) and that is made of three faces numbered 1, 2 and 3 on the figures: top planar face 1 and two lateral cylindrical faces 2 and 3. FIG. 8 shows a perspective view of slot 80. FIG. 9 shows the exploded view of all faces. Duplicated numbers illustrate edges and vertices sharing. Face 1 is a bounded portion of a plane. Boundary of face 1 includes edges 4 and 5, each of them being bounded by vertices 10 and 11. They both have the same supporting circle. Face 2 is bounded by edges 6, 8, 5 and 13 all lying on an infinite cylindrical surface (i.e. the supporting surface of face 2). Faces 1 and 2 are adjacent because they share edge 5. Faces 2 and 3 are adjacent because they share edges 8 and 13. Faces 1 and 3 are adjacent because they share edge 4.

FIG. 10 illustrates the "is bounded by" topological relationship of the B-rep model of slot 80. Nodes of higher layer 101 are faces, nodes of intermediate layer 103 are edges and nodes of lower layer 105 are vertices. FIGS. 11 and 12 illustrate the relationship between topological entities (faces, edges, vertices) and the supporting geometries (infinite cylinder, infinite plane, infinite line, points). In the CAD system, the B-rep model gathers in an appropriate data structure the "is bounded by" relationship and the relationship between topological entities and supporting geometries, and mathematical descriptions of supporting geometries. In other words, the data structures shown on FIGS. 10 and 11 are part of the topological data of this example, which comprise links to geometrical entities of the geometrical data (this is FIG. 11) and links between topological entities (this is FIG. 10).

The mechanical part designed by the method may be an axial mechanical part (that is, a mechanical part having a—e.g. main—axis, e.g. and an axial function with respect to such axis). For example, the mechanical part has an axis of joint (e.g. cylindrical or revolute) to a mating part (which is thus an axial mechanical itself and could be designed via another instance of the method). In such a case, the group of faces selected by the user for the design operation may include faces that define at least one functional feature of the axial mechanical part. In other words, the method is executed on a group of faces that delimit one or more functional features (not necessarily all such delimiting faces). A functional feature is a set of at least one portion and/or at least one hole of the mechanical part that constrains motion of the part with respect to its mating part and/or impacts the effect of such motion on the part. The user may want to edit the functional feature by selecting one or more of the faces around the portion and/or the hole and slide the faces on the rest of part, such design operation corresponding to a physical material stretching, retracting or displacement such as tweaking, via e.g. face pushing/puling/displacement.

Examples of such mechanical parts are now provided. The method may be intended to facilitate the design of such examples of axial mechanical parts.

An axial mechanical part may have a mating part and be linked to its mating part by a revolute joint or by a cylindrical joint. This means that its relative motion is governed by at most two degrees of freedom: translation along an axis (cylindrical joint), rotation around said axis (cylindrical joint and revolute joint). The geometry of an axial part is mainly a revolute solid shape on which functional features are added. Such parts may be axial parts of any rotary machine (e.g. turbine engine, steering column, clutch, gear box, blender, and/or bolt action) or axial parts of any assembly that involves a flowing process (e.g. a silencer, muzzle brake, and/or sound suppressor).

A functional feature may represent a portion of the mechanical part that defines the degrees of freedom of the motion of the part with respect to a mating part. A functional feature may thus represent a notch, a pin, a slot or a lug. The functional feature may thus define a guiding and/or stopping degree of freedom which is translational and/or rotational. A functional feature may alternatively or additionally represent a portion of the mechanical part that contributes to reduce and/or balance the part weight by removing/adding material. In this case, for rotational stability purpose, functional features must be appropriately arranged around the rotation axis. Similarly, for equilibrium purpose, some material can be added in order to save rotational stability.

Rotary machines can be found in all mechanical industries, for example: aerospace, defense, engineering, construction, consumer goods, energy, industrial equipment, marine and offshore, transportation and mobility. From the manufacturing point of view, the revolute shape is obtained by using a turning machine and details are obtained by using a milling machine. When using a CAD system, according of the axial prominence of the part, functional details are very often created and modified by rotating geometries around the axis of the part. The selecting S10 and the defining S20 may be performed this way.

Figure 13:
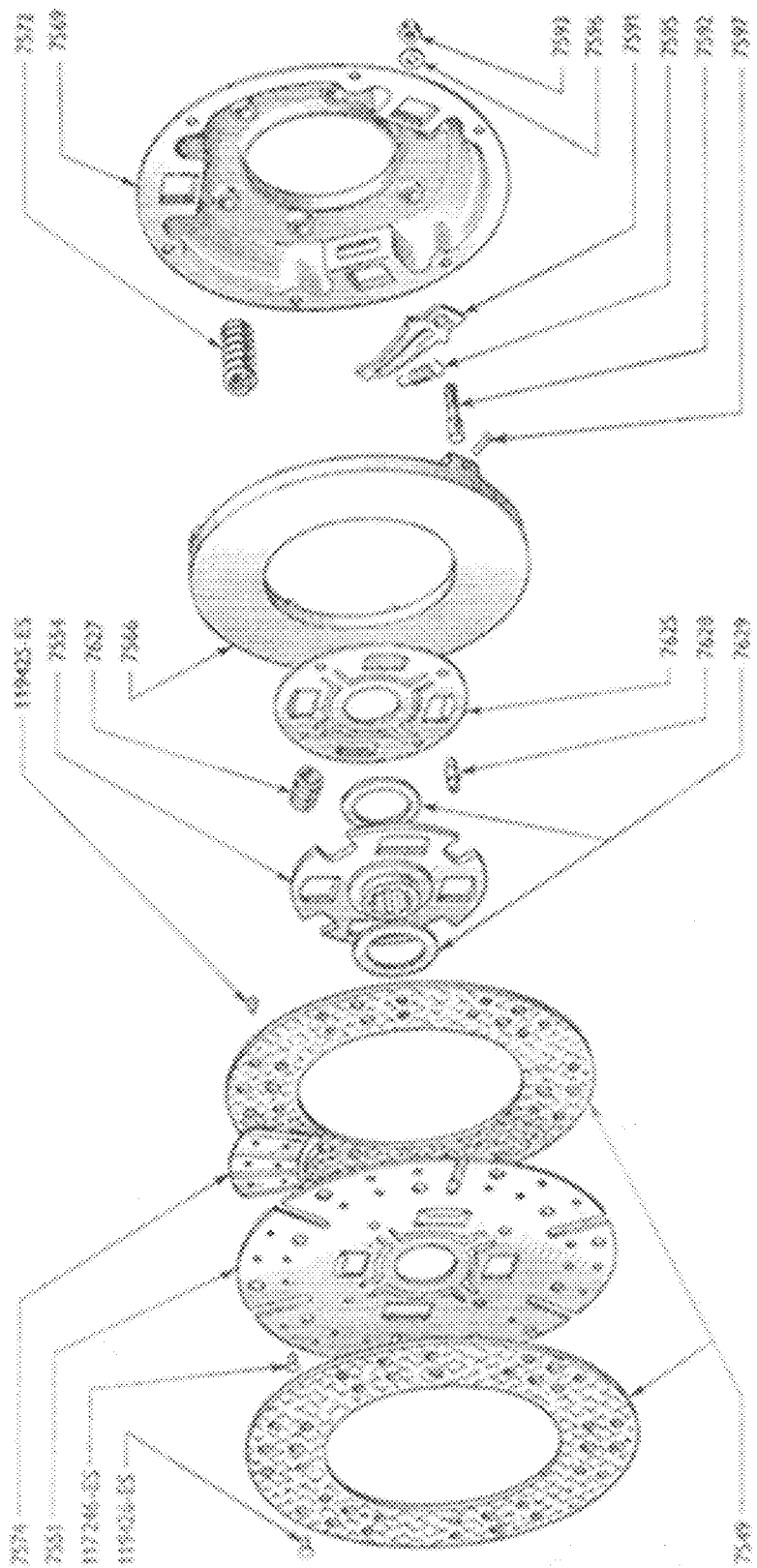

FIGS. 13-15 show examples of axial mechanical parts that can be efficiently designed by the method. FIG. 13 illustrates typical clutch parts. FIG. 14 illustrates typical steering column parts. FIG. 15 illustrates a typical muzzle brake.

Now, the trajectories defined at S20 may be defined by a sliding edition of a functional feature of an axial mechanical part along and/or around the axis of the mechanical part (i.e. this means that the user intends the portion or hole of the mechanical part that defines the functional feature to be slid on—or with respect to—the rest of the mechanical part). In other words, the trajectories are defined at S20 via a user-edition that includes sliding faces of the functional feature (i.e. faces that delimit the functional feature and that produce a non-null swept volume when slid, because their respective defined trajectory does not make them slide on the surface on which they are initial defined) on a constant axis-forming body (e.g. of cylindrical shape) of the mechanical part. The sliding may also include a re-dimensioning of the functional feature, for example if not the same trajectory is used for all the complementary faces of the functional feature, or the functional feature may be rigidly slid. The sliding may correspond to a tweaking operation on the functional feature with respect to the axis of the axial mechanical part.

For example, the functional part forms at least one protuberance and/or at least one hole that extends radially with respect to the axis of the axial mechanical part. In an example, the protuberance or the hole is defined by radial faces (i.e. faces whose supporting surface contains the axis or is parallel to the axis), faces perpendicular to the axis, and/or polar faces (i.e. faces whose supporting surface is a cylinder based on the axis). In other examples such geometries are only substantial. The sliding edition of the functional part may then consist in selecting only radial faces and rotating them (i.e. the axis of rotation being the axis of the part), all other faces being left unmoved. The sliding edition may alternatively consist in selecting only faces perpendicular to the axis, and translating them along the axis (i.e. the translation direction is the axis), all other faces being left unmoved. Alternatively, both these types of faces may be selected and any combination of such rotation and/or such translation may be defined. In all these examples, the sliding motion may apply to all selected faces at once, via a drag-and-drop-like gesture, as explained earlier.

For example, the method may be executed to commute protuberances and/or holes that are located on the same height (i.e. axial abscissa) on the mechanical part (for example because the user made a mistake in orienting the functional feature(s) at first). This can be constrained by a predetermined commutation objective, e.g. a target list of angles. The commutation may be performed easily via selecting at once only radial faces of the protuberances and/or holes, and then slide-rotating the whole selection (such that each protuberance and/or hole is at the correct one of the predetermined target list of angles in the example). Any functional feature crossed in the process is left untouched.

In another example, the method may be executed to edit the height of several protuberances and/or holes on the axial mechanical part (for example because the user made a mistake in the chosen height at first). This can be constrained by a predetermined edition objective, e.g. a target height. The edition may be performed easily via selecting at once only the perpendicular faces of the protuberances and/or holes, and then slide-translating the whole selection (to the predetermined target height in the example). Any functional feature crossed in the process is left untouched.

Providing such a design operation to the mechanical designer is particularly useful in the context of axial mechanical parts, because the parameters of the functional features that correspond to the position and/or dimension of the functional features or the positions of the faces of the functional features along and/or around the axis of the axial mechanical part are the parameters that most often need to be re-adjusted and re-defined and on potentially long distances (compared to radius values). Furthermore, an axial mechanical part may be crowded relatively with many functional features. In such a case, the method allows a user to redefine the position (along and/or around the axis) of a functional feature easily via slide-moving faces thereof without bothering to go around other encountered functional features (which can thus be crossed without being edited by the crossing and the eraser side effect, which is practical in the field of axial mechanical part design). The method is thus particularly ergonomic in such a situation. In an example, the axial mechanical part includes at least two, or at least five functional features.

Typical edition scenarios where such a trajectory is defined are now discussed with reference to FIGS. 16-18. The typical mechanism is a bolt. It is made of a cylindrical part A featuring with two lugs. FIG. 16 shows such a mechanical part, designed by the method. Part A is translated along axis B into part C in such a way that the lugs are aligned with the openings. Then, part A is rotated around axis B until the lugs are in contact with internal walls of the openings. Retractable pin D is to prevent reverse rotation of part A inside part C. FIG. 17 illustrates the assembly. A first edition scenario is to adjust the lugs dimensions and axial positioning by moving the faces around axis B. A second edition scenario is to adjust the opening of part C for a correct fitting with part A. Once more, this is done by moving the faces of the opening around axis B. Of course, retractable pin D must not be lost when neighboring faces are adjusted. A third edition scenario is to perform the same kind of adjustment with a three lugs bolt A', as illustrated in FIG. 18. The method allow to perform these design scenarios efficiently.

An example of implementation of the method is now discussed.

Examples of selected faces (e.g. at S10) and target faces (e.g. start and end faces involved, e.g. in the computations S100) for the implementation are now discussed.

Input objects are the input solid s, the user-selected faces on this solid, noted $f_i$, i=1, ..., n and the motion trajectory, noted W:$[0,1] \rightarrow SO(3)$ where SO(3) is the set of rigid motions in the three-dimensional space. For each $t \in [0,1]$, W(t) is a rigid motion, meaning that, for any $X \in \mathbb{R}^3$, $W(t)(X)=R(t)X+T(t)$ where R(t) is a rotation matrix and T(t) is a translation vector. By definition, W(0) is the starting position and W(1) is the end position. The starting position is the identity, that is W(0)=Id. Initial positions of selected faces are noted $f_i^0=W(0)(f_i)=f_i$ for i=1, ..., n. Final positions of selected faces are noted $f_i^1=W(1)(f_i)$ for i=1, ..., n.

The method of the example implementation deals with linear or revolute motion. A linear motion is defined by:

$$W(t)(X)=X+tT$$

where vector T that is t-independent. A revolute motion is defined by:

$$W(t)(X)=R(t)(X-P)$$

where R(t) is a rotation around an axis defined by point P and a vector U that are both t-independent.

The example implementation handles very well the case where, during the sliding edition, the functional feature selected (via selection of the group of faces) and intended to be designed/edited (via definition of the trajectories) traverses (i.e. crosses) at least one other functional feature. The method proves particularly efficient in this example, because said other functional feature is not edited by the method, thereby avoiding the eraser side effect. Furthermore, the avoidance is ensured via fast computations, an example thereof being now detailed. This ensures that the system remain responsive and performs the update of the B-Rep fast.

Data structures for Add-blocks (i.e. swept volumes having a material adding label) and Remove-blocks (swept volumes having a material removal label) are first detailed.

For each $i \in \{1, \ldots, n\}$ and for any point $X \in f_i$, let $n_i(X)$ be the outer normal vector of face $f_i$ at point X. The trajectory of point X is the 3D parameterized curve $C_X:[0,1] \to \mathbb{R}^3$ defined by $C_X(t)=R(t)X+T(t)$. In order to properly identify swept volumes, the method may require that the motion trajectory and the faces must satisfy a regularity condition: the outer normal vector always features a constant sign scalar product with the tangent vector of the trajectory. In other words, the vector field defined by motion trajectory always flows in the direction of the outer normal vector. Precisely, at parameter $t \in [0,1]$ point $X \in f_i$ is at position $C_X(t)$ and the tangent vector of its trajectory is $C'_X(t)=R'(t)X+T'(t)$ where notation ' is the derivation with respect to variable t. Furthermore, the outer normal vector at initial position $n_i(X)$ is changed into $R(t)n_i(X)$. The regularity condition is defined by $$\text{Sign}\langle C'_X(0)|n_i(X)\rangle = \text{Sign}\langle C'_X(t)|R(t)n_i(X)\rangle$$

for all $t \in [0,1]$ and for all $X \in f_i$.

If this condition is not respected, the method of the example implementation may output a system error or handle the case in any way. It is considered that this condition is respected in the following.

If this constant sign is positive the motion trajectory is oriented in the direction of the outer normal vector and the swept volume of face $f_i$ is marked as (i.e. label assignment) an A-block. The method understands that this is supposed to add material to the solid and it is noted $A_i$ with:

$$A_i = \bigcup_{t \in [0,1]} W(t)(f_i)$$

If this constant sign is negative the motion trajectory is oriented in the opposite direction of the outer normal vector and the swept volume of face $f_j$ is an R-block. It is supposed to remove material from the solid and is noted $R_j$ with:

$$R_j = \bigcup_{t \in [0,1]} W(t)(f_j)$$

The set of indexes $\{1, \ldots, n\}$ can now be split into two disjoint subsets $\{1, \ldots, n\}=I \cup J$ such that A-blocks are $A_i$, $i \in I$ and R-blocks are $R_j$, $j \in J$.

Figure 21:
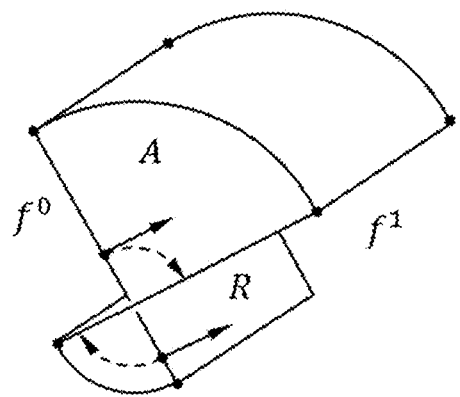

FIG. 19 illustrates a regular motion of a face featuring a positive sign. Face $f^0$ is rotated around point P up to its final position $f^1$. FIG. 20 illustrates the corresponding A-block. FIG. 21 illustrates a singular situation where the scalar product sign is not constant. The resulting swept volume is twisted and would add material through region A and, at the same time, remove material through region R.

A Core algorithm according to the example of the method is now presented.

The algorithm runs three steps. The first step computes the appropriate amount of material $M^+$ to be added to the input solid S. Blocks overlaps are identified by testing collisions between A-blocks $A_i$ and end faces $f_j^1$ of R-blocks, which is written $f_j^1 \cap A_i \neq \emptyset$ as detailed below.

```
M⁺ := ø
For all i ∈ I do begin
    B:=ø
    For all j ∈ J do begin
        If f¹ⱼ ∩ Aᵢ ≠ ø then
            B:=B ∪ Rⱼ
        End if
    End for
    M⁺:=M⁺ ∪ (Aᵢ − B)
End for
```

The second step computes the appropriate amount of material $M^-$ to be removed from the input solid S. Blocks overlaps are identified by testing collisions between R-blocks $R_j$ and start faces $f_i^0$ of A-blocks, which is written $f_i^0 \cap R_j \neq \emptyset$ as detailed below.

```
M⁻ := ø
For all j ∈ J do begin
    B:=ø
    For all i ∈ I do begin
        If f⁰ᵢ ∩ Rⱼ ≠ ø then
            B:=B ∪ Aᵢ
        End if
    End for
    M⁻:= M⁻ ∪ (Rⱼ − B)
End for
```

The third and last step actually removes and adds material to the input solid S, which yields the resulting solid S'.

$$S'=(S-M^-)\cup M^+$$

An example of running the algorithm is now discussed.

Figure 22:
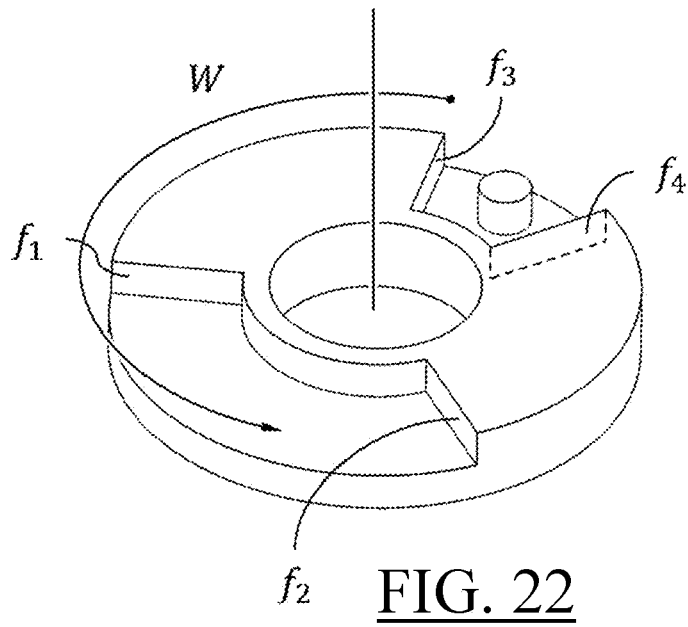
Figure 23:
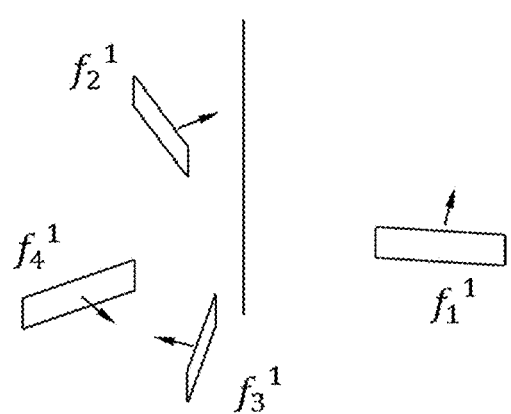
Figure 24:
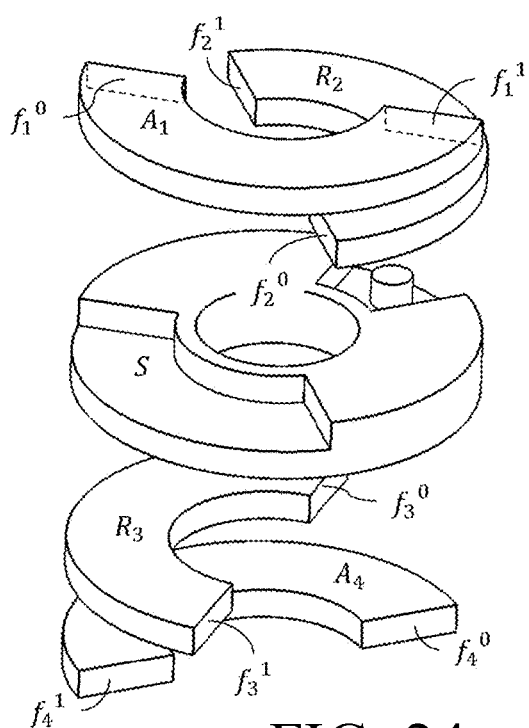

The algorithm is illustrated with an example featuring blocks overlaps and a small detail that is involved despite it is not explicitly selected. Faces $f_1$, $f_2$, $f_3$ and $f_4$ are selected on the solid in FIG. 22. The motion W is a 180 degree rotation around the vertical axis. The detail is the cylindrical slot between faces $f_3$ and $f_4$. End faces are respectively $f_1^1$, $f_2^1$, $f_3^1$ and $f_4^1$ as illustrated in FIG. 23 together with the outer normal vectors. Scalar product analysis yields The "add" vs. "remove" typing $I=\{1,4\}$ and $J=\{2,3\}$. Respective swept volumes $A_1$, $R_2$, $R_3$ and $A_4$ are illustrated in FIG. 24 together with the input solid. For clarity, swept volumes are translated along the rotation axis. Collisions between A-blocks $A_1$, $A_4$ and end faces $f_2^1$, $f_3^1$ of R-blocks $R_2$, $R_3$ are as follows:

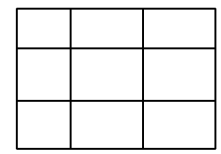

According to the first step of the core algorithm, this yields:

$$M^+ = (A_1 - R_3) \cup (A_4 - R_2)$$

Figure 25:
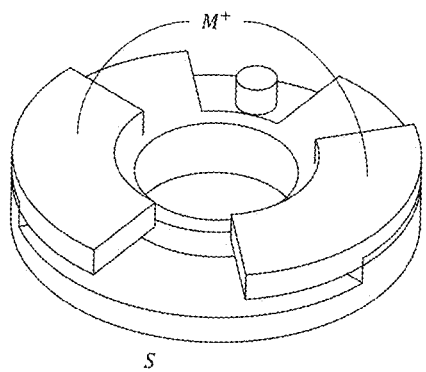

FIG. 25 illustrates $M^+$ together with the input solid S. Notice that $M^+$ is made of two connected components. For clarity $M^+$ is slightly translated upward. It should be noticed how $M^+$ saves the neighborhood of the cylindrical slot. Collisions between R-blocks $R_2$, $R_3$ and start faces $f_1^0$, $f_4^0$ of A-blocks $A_1$, $A_4$ are as follows:

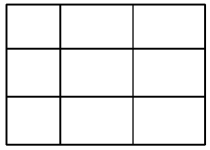

According to the second step of the core algorithm, this yields:

$$M^- = (R_2 - A_4) \cup (R_3 - A_1)$$

Figure 26:
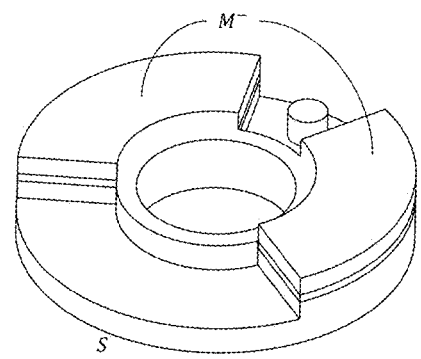
Figure 27:
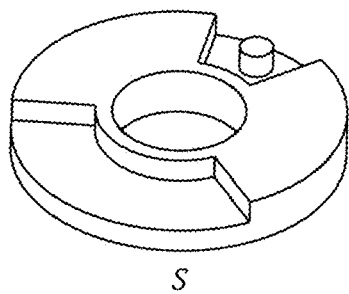
Figure 27:
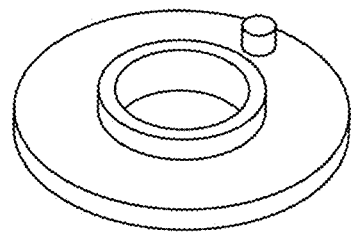
Figure 27:
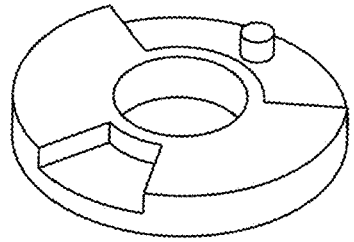

FIG. 26 illustrates $M^-$ together with the input solid. Notice that $M^-$ is made of two connected components. For clarity $M^-$ is slightly translated upward. Here again, it should be noticed how $M^-$ saves the neighborhood of the cylindrical slot. According to the third step of the core algorithm, the resulting solid is $S' = (S - M^-) \cup M^+$ as illustrated in FIG. 27 together with the intermediate result $S - M^-$.

The invention claimed is:

1. A computer implemented method for designing a 3D modeled object that represents a mechanical part, the 3D modeled object being defined by a boundary representation ("B-Rep"), the method comprising:
   selecting a group of faces of the B-Rep;
   defining a trajectory for each respective face of the group of faces;
   computing, for each face of the group of faces, a respective swept volume, the swept volume corresponding to the volume swept by the respective face with respect to the trajectory;
   assigning a material removal label or a material adding label to each swept volume, according to a position of the swept volume at the respective face with respect to an interior of the 3D modeled object; and
   updating the B-Rep with a material removal volume and then a material adding volume,
   wherein the material adds volume corresponding to the union of all swept volumes having a material adding label, each respective swept volume having a material adding label being in the union subtracted by all swept volumes having a material removal label and an end face that collides with the respective swept volume having a material adding label, and
   wherein the material removal volume corresponds to the union of all swept volumes having a material removal label, each respective swept volume having a material removal label being in the union subtracted by all swept volumes having a material adding label and a start face that collides with the respective swept volume having a material removal label.

2. The method of claim 1, wherein the mechanical part is an axial mechanical part having an axis and the group of faces includes faces that define at least one functional feature of the axial mechanical part, the at least one functional feature being a set of at least one portion and/or at least one hole of the axial mechanical part that constrains motion of the axial mechanical part with respect to a mating part and/or impacts the effect of such motion on the axial mechanical part.

3. The method of claim 2, wherein the trajectories are defined by a sliding edition of the functional feature along and/or around the axis of the mechanical part.

4. The method of claim 3, wherein the trajectories are defined by a user via at least one sliding motion graphical user-interaction.

5. The method of claim 3, wherein, during the sliding edition, the functional feature crosses at least one other functional feature.

6. The method of claim 4, wherein, during the sliding edition, the functional feature crosses at least one other functional feature.

7. The method of claim 1, further comprising producing a mechanical part that geometrically corresponds to the 3D modeled object.

8. A non-transitory computer readable storage medium having recorded thereon a computer program comprising instructions for performing a computer implemented method for designing a 3D modeled object that represents a mechanical part, the 3D modeled object being defined by a boundary representation ("B-Rep"), the method comprising:
   selecting a group of faces of the B-Rep;
   defining a trajectory for each respective face of the group of faces;
   computing, for each face of the group of faces, a respective swept volume, the swept volume corresponding to the volume swept by the respective face with respect to the trajectory;
   assigning a material removal label or a material adding label to each swept volume, according to a position of the swept volume at the respective face with respect to an interior of the 3D modeled object; and
   updating the B-Rep with a material removal volume and then a material adding volume,
   wherein the material adding volume corresponds to the union of all swept volumes having a material adding label, each respective swept volume having a material adding label being in the union subtracted by all swept volumes having a material removal label and an end face that collides with the respective swept volume having a material adding label,
   wherein the material removal volume corresponds to the union of all swept volumes having a material removal label, each respective swept volume having a material removal label being in the union subtracted by all swept volumes having a material adding label and a start face that collides with the respective swept volume having a material removal label.

9. The non-transitory computer readable storage medium of claim 8, wherein the mechanical part is an axial mechanical part having an axis and the group of faces includes faces that define at least one functional feature of the axial mechanical part, the at least one functional feature being a set of at least one portion and/or at least one hole of the axial mechanical part that constrains motion of the axial mechanical part with respect to a mating part and/or impacts the effect of such motion on the axial mechanical part.

10. The non-transitory computer readable storage medium of claim 9, wherein the trajectories are defined by a sliding edition of the functional feature along and/or around the axis of the mechanical part.

11. The non-transitory computer readable storage medium of claim 10, wherein the trajectories are defined by a user via at least one sliding motion graphical user-interaction.

12. The non-transitory computer readable storage medium of claim 10, wherein, during the sliding edition, the functional feature crosses at least one other functional feature.

13. The non-transitory computer readable storage medium of claim 11, wherein, during the sliding edition, the functional feature crosses at least one other functional feature.

14. A system comprising:
a processor coupled to a memory and a graphical user interface, the memory having recorded thereon a computer program comprising instructions for performing a computer implemented method for designing a 3D modeled object that represents a mechanical part, the 3D modeled object being defined by a boundary representation ("B-Rep"), wherein the processor is configured by the computer program to
select a group of faces of the B-Rep;
define a trajectory for each respective face of the group of faces;
compute, for each face of the group of faces, a respective swept volume, the swept volume corresponding to the volume swept by the respective face with respect to the trajectory;
assign a material removal label or a material adding label to each swept volume, according to a position of the swept volume at the respective face with respect to an interior of the 3D modeled object; and
update the B-Rep with a material removal volume and then a material adding volume,
wherein the material adding volume corresponding to the union of all swept volumes having a material adding label, each respective swept volume having a material adding label being in the union subtracted by all swept volumes having a material removal label and an end face that collides with the respective swept volume having a material adding label, and
wherein the material removal volume corresponding to the union of all swept volumes having a material removal label, each respective swept volume having a material removal label being in the union subtracted by all swept volumes having a material adding label and a start face that collides with the respective swept volume having a material removal label.

15. The system of claim 14, wherein the mechanical part is an axial mechanical part having an axis and the group of faces includes faces that define at least one functional feature of the axial mechanical part, the at least one functional feature being a set of at least one portion and/or at least one hole of the axial mechanical part that constrains motion of the axial mechanical part with respect to a mating part and/or impacts the effect of such motion on the axial mechanical part.

16. The system of claim 15, wherein the trajectories are defined by a sliding edition of the functional feature along and/or around the axis of the mechanical part.

17. The system of claim 16, wherein the trajectories are defined by a user via at least one sliding motion graphical user-interaction.

18. The system of claim 16, wherein, during the sliding edition, the functional feature crosses at least one other functional feature.

19. The system of claim 17, wherein, during the sliding edition, the functional feature crosses at least one other functional feature.

* * * * *